United States Patent Office 3,541,163
Patented Nov. 17, 1970

3,541,163
PROCESS FOR PREPARING HEPTACHLOR
Robert E. Whaley, Memphis, Tenn., assignor to Velsicol Chemical Corporation, Memphis, Tenn., a corporation of Tennessee
No Drawing. Filed Mar. 18, 1968, Ser. No. 714,022
Int. Cl. C07c 17/10, 23/20
U.S. Cl. 260—648    17 Claims

ABSTRACT OF THE DISCLOSURE

A process for preparing 1,4,5,6,7,8,8-heptachloro-3a,4,7,7a-tetrahydro-4,7-methanoindene which comprises reacting chlorine with 4,5,6,7,8,8-hexachloro-3a,4,7,7a-tetrahydro-4,7-methanoindene in the presence of a free radical inhibitor.

---

This invention relates to the preparation of heptachlor and, more particularly, relates to an improved process for preparing heptachlor by the chlorination of chlordene.

Heptachlor, having the chemical designation 1,4,5,6,7,8,8-heptachloro-3a,4,7,7a-tetrahydro-4,7 - methanoindene, is a valuable insecticidal chemical and has been prepared by several different methods and procedures. One of the principal preparational processes involves chlorinating chlordene, having the chemical designation 4,5,6,7,8,8-hexachloro-3a,4,7,7a-tetrahydro-4,7-methanoindene, to effect the substitution of chlorine for one of the hydrogen atoms on the 1-position carbon atom. This chlorination reaction can, in general, be represented by the following equation:

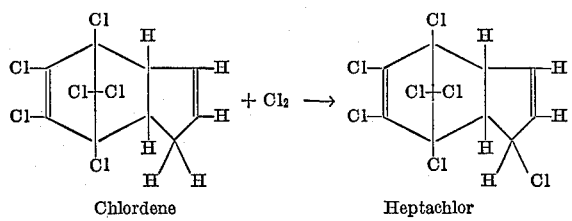

Chlordene                Heptachlor

While the chlorination of chlordene according to the above equation is the preferred process for preparing heptachlor, it suffers from several disadvantages. Foremost of these is that during the chlorination an addition type reaction takes place simultaneously with the substitution reaction. This addition reaction adds chlorine to the double bond of the chlordene in the 2–3 position and results in the formation of other chlorinated compounds such as nonachlor and chlordane having the following respective structural formulae:

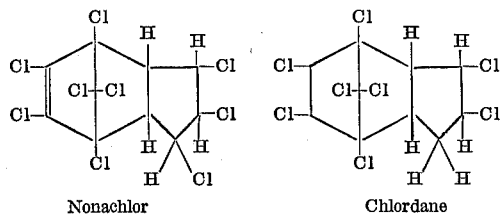

Nonachlor                Chlordane

This simultaneous production of these other chlorinated compounds has the adverse effect of substantially reducing the yield of the desired haptachlor product. This is a particularly serious limitation because frequently it is convenient to utilize all of the chlorinated compounds in the chlorination product in admixture as an insecticide and even a slight reduction in the conversion of the insecticidally inactive chlordene to the highly active heptachlor will have a serious adverse effect upon the activity of the insecticide.

Accordingly, an object of this invention is to provide an improved process for preparing heptachlor by increasing the yield of the heptachlor product obtained in the chlorination of chlordene. Another object is to provide an improved process which in addition to increasing the yield of the heptachlor product also increases the ratio of the heptachlor to the other chlorinated materials, such as chlordane, in the chlorination product. A further object is to provide a process for obtaining such increased yield in a convenient and particularly desirable industrial manner. These and other objects of this invention will be apparent from the following further detailed description thereof.

The objects of this invention are realized by effecting the chlorination of chlordene in the presence of an added material which acts to favor the substitution reaction of the chlorine replacement of one of the hydrogen atoms on the 1-position carbon atom of the chlordene and simultaneously acts to suppress the addition reaction of the chlorine addition to the double bond in the 2–3 position of the chlordene. The materials which can be used in the chlorination of chlordene according to this invention to achieve an improved yield of the heptachlor product can be described or characterized as free radical or polymerization inhibitors. These inhibitors possess the general property of being able to terminate or suppress free radical initiated reactions and their operation is more fully explained in the "Encyclopedia of Chemical Technology," 2nd Ed. Kirk-Othmer, John Wiley and Sons, New York 1966, vol. 10, page 116. The free radical inhibitors which can be employed in the process include a wide variety of different chemical compounds and a generalized summary of these inhibitors is reported in "The Polymer Handbook," J. Brandrup and E. H. Immergut, Interscience Publishers, New York 1966, II–71. In general, most of the known free radical inhibitors can be utilized in the process with the major limitations being that the inhibitor employed must be relatively inert to the reactants and not provide contamination of the heptachlor product, particularly any contamination which would adversely affect its insecticidal activity. Typical examples of the inhibitors which can be utilized include aromatic compounds having quinoid, nitro, nitroso, amino, or phenolic substituents or structures such as quininoid compounds, for example quinone or phenanthrene-quinone; phenolic compounds for example phenol, hydroquinone, catecol or creosols; nitrogen containing compounds, particularly nitroaromatic hydrocarbons, for example dinitrobenzene, nitrodimethylaniline, nitrosodimethylaniline, and aromatic amines, for example, diphenylamine.

The chlorination of chlordene to produce heptachlor effected in the presence of a free radical inhibitor according to this invention can, in general, be conducted according to the same general conditions and procedures conventionally employed for the chlorination. The chlorination reaction can be effected either in the presence or in the absence of a catalyst although the use of a catalyst is particularly preferred, especially to increase the production of heptachlor in the final chlorination product and to accelerate the reaction. A wide variety of different catalysts can be used for this purpose and typically all of the catalysts commonly employed for effecting the chloration reaction can be used including such catalysts as polyvalent metal silicates or mineral silicates, metallic iron, aluminum chloride, diatomaceous earth, aluminas, infusorial earth and silicas as well as various combinations thereof. Particularly preferred catalysts for the reaction, especially to maximize the yield of the heptachlor product include alumina, silica and polyvalent metal silicates or mineral silicates such as fuller's earth which are more fully described in United States Patents Nos. 2,741,639, 2,741,-640 and 2,741,641. When utilizing a catalyst, the quantity employed will depend upon such factors as the particular catalyst and the inhibitor used as well as the desired reaction rate. Usually, the quantity of catalyst can range from about 0.5 to about 25 weight percent based upon the weight of the chlordene with a more limited range of from about 2.5 to about 7.5 weight percent being more suitably used when employing such catalysts as polyvalent metal silicates, for example, fuller's earth.

A solvent is advantageously utilized for the chlorination reaction and, in general, most solvents capable of substantially solubilizing the chlordene at the reaction conditions which are inert to the chlorine and halogenated reactant and product as well as the inhibitor can be suitably employed. Typical inert solvents for the reaction include halogenated hydrocarbons such as halogenated alkanes, for example, carbon tetrachloride, chloroform, tetrachloroethane or hexachloroethane or various combinations thereof. The particular solvent utilized will depend upon such factors as the catalyst, if used, and the particular inhibitor. Usually, however, particularly suitable results are achieved when employing such solvents as carbon tetrachloride. The quantity of the solvent is not overly important but, generally, there should at least be a quantity sufficient to substantially dissolve the chlordene with the upper limit being influenced by the desired reaction rate which is a function of reactant dilution. The temperature used to effect the chlorination reaction can be varied with the optimum temperature being dependent upon such factors as the particular reaction rate desired, the particular catalyst and quantity used as well as the type and quantity of inhibitor present. Usually, the temperature at substantially atmospheric pressure can range from about −20 to about 145° C. with a more limited range of from about 15° to about 45° C. being particularly preferred in most instances. The duration of the reaction at such temperatures will vary but usually the reaction is complete with high heptachlor yields in from a few minutes to two hours under batch-type operating conditions. Conveniently, the appropriate reaction end point can be readily determined by continuously analyzing the reaction mixture and when the stoichiometric quantity of chlorine has reacted, the reaction can be terminated.

The relative proportions of the chlorine and chlordene used in the reaction can be varied but, generally, to favor the formation of heptachlor and to suppress the formation of the other chlorinated materials it is important to avoid using a substantial excess of chlorine above the stoichiometric quantity required. Advantageously, the quantity of chlorine reacted with the chlordene should range from about 0.5 to about 1.50 mol of chlorine per mol of chlordene with a more limited range from about 0.75 to about 1.25 mol of chlorine per 1 mol of chlordene generally being preferred.

The particular inhibitor or combination of inhibitors used in the chlorination reaction to maximize the formation of heptachlor will depend upon such factors as the type of catalyst, if used, and the solvent employed. Typically, when effecting the chlorination using catalysts such as aluminas, silicas, or polyvalent metal silicates, particularly desirable results are achieved when employing such inhibitors as phenolic compounds, for example, hydroquinone or aromatic amines, for example, diphenylamine. The quantity of the inhibitor employed can be varied and the particular amount used to maximize heptachlor formation will be a function of such factors as the type of catalyst, if used, the particular inhibitor and the solvent. Generally, the amount of the inhibitor present is usually quite small and can range from about 0.001 to about 0.01 weight percent based upon the weight of the chlordene. A more limited range from about 0.00075 to about 0.0075 is preferred, however, particularly when utilizing phenolic or aromatic amine type inhibitors.

The chlorination process of this invention can be effected in either a batch or continuous type operation. A batch type procedure is generally preferred, however, and one illustrative procedure involves charging chlordene and a suitable solvent such as carbon tetrachloride to a sealed reaction vessel. If used, a catalyst such as a polyvalent metal silicate, for example an anhydrous Fuller's earth, is added and the reaction mixture heated to the desired temperature. Then, with suitable agitation, the appropriate quantity of chlorine is charged to the vessel and into reactive contact with the chlordene. The stirring of the mixture is continued until the reaction is complete which can be readily determined by analyzing the reaction mixture for the point where substantially the stoichiometric quantity of chlorine has reacted. When the reaction is complete, the reaction mixture can be cooled and the desired heptachlor product recovered using conventional procedures such as distillation either as a substantially pure compound or as the predominant component of an insecticidal product admixed with minor quantities of other chlorinated compounds.

The following example is offered to illustrate the improved chlorination process of this invention. It is not intended, however, to limit the invention to the particular procedure, conditions, or inhibitors illustrated therein:

EXAMPLE 1

Heptachlor was prepared in a series of chlorination reactions according to the following general procedures:

A dried, activated fuller's earth catalyst (Florex) 2 grams and chlordene (4,5,6,7,8,8-hexachloro-3a,4,7,7a-tetrahydro-4,7-methanoindene) 36 grams (0.106 mole), carbon tetrachloride, 54 grams, and an inhibitor, were charged to a pre-dried reaction flask equipped with stirring and heating means and an overhead condenser. The temperature of the mixture was adjusted to about 30° to 40° C. and then about 7.8 grams (0.110 mol) of chlorine were charged to the flask. While maintaining the temperature within such range, the mixture was stirred until substantially all of the chlorine reacted which usually required a period of about 20 minutes. The stirring was then continued for about 20 minutes more at such temperature. The catalyst was then removed by filtration and the carbon tetrachloride solvent and inhibitor were removed from the reaction mixture by distillation. The remaining chlorination reaction product was then analyzed for the weight percent of heptachlor and the weight ratio of heptachlor to chlordane. The weight ratio was determined utilizing gas-liquid chromatography techniques and the weight percent heptachlor was determined using the following procedure which is based upon the fact that one chlorine atom in heptachlor will react with silver chloride under the conditions of the procedure while the chlorine atoms of the related chlorinated products are inert. A weighed sample of the chlorinated product was charged to a flask and dissolved in 50 ml. of acetic acid. Then 25 ml. of 0.1 N silver nitrate solution were added and the mixture refluxed for about 45 minutes. The mixture was cooled and washed with an 80 percent solution of acetic acid. Glass and silver electrodes were inserted into the washed mixture which was then titrated with a 0.1 N sodium chloride solution to the potentiometric end point. The percent heptachlor is then determined according to the equation Percent heptachlor=37.335 (25×normality of the $AgNO_3$-ml. of NaCl×normality of the NaCl)/gram weight of sample A series of control chlorinations were also effected using the same procedure in the absence of an inhibitor and the results of both series of chlorinations are summarized in the following Table I:

EXAMPLES 2 TO 6

Heptachlor was prepared in a series of chlorination reactions using the general procedure of Example 1 but differing primarily in that a much larger quantity of chlordene was chlorinated. Typically the quantity of chlordene charge in the series of chlorinations ranged from about 3,000 to about 10,000 pounds. The chlorination conditions used were substantially the same as was those of Example 1 with minor adjustment for the larger quantity of the chlordene and a larger reactor. In each of the examples a series of control chlorinations were effected in the absence of an inhibitor for comparative purposes. The weight percent of heptachlor and the ratio of the heptachlor to chlordane in the chlorination product were determined using the procedures of Example 1. The result of the chlorinations for these examples are summarized in the following table and the improvement in yield and product ratio when utilizing the inhibitor according to the invention may be observed by comparing the results achieved when using an inhibitor with those achieved without an inhibitor.

TABLE I

| Chlorination reaction No. | Inhibitor | Inhibitor concn. wt. percent based on chlordene | Heptachlor wt. percent in product (average) | Heptachlor chlordane ration product (average) |
|---|---|---|---|---|
| Example 1: | | | | |
| 1-6 | Hydroquinone | 0.001 | 74.9 | 4.13 |
| 7-12 | do | 0.005 | 76.6 | |
| 13-16 | Diphenylamine | 0.005 | 76.0 | |
| 17-19 | None | | 72.0 | 4.1 |
| Example 2: | | | | |
| 1-11 | Hydroquinone | 0.001 | 73.6 | 4.6 |
| 12-20 | None | | 72.3 | 3.7 |
| Example 3: | | | | |
| 21-33 | Hydroquinone | 0.005 | 74.1 | 4.8 |
| 34-45 | None | | 72.0 | 4.6 |
| Example 4: | | | | |
| 46-52 | Hydroquinone | 0.005 | 73.3 | 4.3 |
| 53-57 | None | | 71.4 | 4.2 |
| Example 5: | | | | |
| 58-64 | Hydroquinone | 0.005 | 74.8 | 4.3 |
| 65-72 | None | | 72.7 | 4.0 |
| Example 6: | | | | |
| 73-81 | Hydroquinone | 0.005 | 74.4 | 4.6 |
| 82-88 | None | | 73.2 | 4.3 |

I claim:

1. A process for preparing 1,4,5,6,7,8,8-heptachloro-3a,4,7,7a-tetrahydro-4,7-methanoindene which comprises reacting chlorine with 4,5,6,7,8,8-hexachloro-3a,4,7,7a-tetrahydro-4,7-methanoindene in the presence of a free radical inhibitor and a catalyst selected from the group consisting of polyvalent metal silicates, polyvalent mineral silicates, metallic iron, aluminum chloride, diatomaceous earth, aluminas, infusorial earth and silicas.

2. The process of claim 1 wherein the reaction is effected in the presence of an inert solvent.

3. The process of claim 1 wherein the inhibitor is present in an amount of from about 0.0001 to about 0.01 weight percent based upon the weight of the 4,5,6,7,8,8-hexachloro-3a,4,7,7a-tetrahydro-4,7-methanoindene.

4. The process of claim 1 wherein the reaction is effected at a temperature of about −20° C. to about 145° C.

5. The process of claim 1 wherein the inhibitor is hydroquinone.

6. The process of claim 1 wherein the inhibitor is diphenylamine.

7. The process of claim 2 wherein the inert solvent is carbon tetrachloride.

8. The process of claim 1 wherein the catalyst is fuller's earth.

9. The process of claim 1 wherein the inhibitor is present in an amount ranging from about 0.0001 to about 0.01 weight percent based upon the weight of the 4,5,6,7,8,8-hexachloro - 3a,4,7,7a - tetrahydro - 4,7 - methanoindene, and the reaction is effected at a temperature from about −20° C. to about 145° C. in the presence of an inert solvent.

10. The process of claim 9 wherein the reaction is effected at a temperature of from about 15° to about 45° C.

11. The process of claim 9 wherein the inhibitor is present in an amount of from about 0.00075 to about 0.0075 weight percent based upon the weight of the 4,5,6,7,8,8-hexachloro-3a,4,7,7a-tetrahydro-4,7-methanoindene.

12. The process of claim 9 wherein the reaction is effected in the presence of carbon tetrachloride as solvent.

13. The process of claim 9 wherein the catalyst is fuller's earth.

14. The process of claim 9 wherein the inhibitor is hydroquinone.

15. The process of claim 9 wherein the inhibitor is diphenylamine.

16. The process of claim 1 wherein the reaction is effected in the presence of fuller's earth as catalyst, carbon tetrachloride as an inert solvent, at a temperature of from about 15° C. to about 45° C. and the inhibitor is hydroquinone present in an amount of from about 0.00075 to about 0.0075 weight percent based upon the weight of the 4,5,6,7,8,8-hexachloro-3a,4,7,7a-tetrahydro-4,7-methanoindene.

17. The process of claim 1 wherein the reaction is effected in the presence of fuller's earth as catalyst, carbon tetrachloride as an inert solvent, at a temperature of from about 15° C. to about 45° C., and the inhibitor is diphenylamine present in an amount of from about 0.00075 to about 0.0075 weight percent based upon the weight of the 4,5,6,7,8,8-hexachloro-3a,4,7,7a-tetrahydro-4,7-methanoindene.

References Cited

UNITED STATES PATENTS 2,576,666   11/1951   Bluestone et al.
2,741,641   4/1956   Kleiman.

DANIEL D. HORWITZ, Primary Examiner